3,337,846
VEHICLE DIRECTIONAL, EMERGENCY, AND DAYLIGHT DRIVING SIGNAL LIGHT SYSTEM
Jesse R. Hollins, 1059 E. 22nd St., Brooklyn, N.Y. 11210
Filed May 4, 1964, Ser. No. 364,561
5 Claims. (Cl. 340—81)

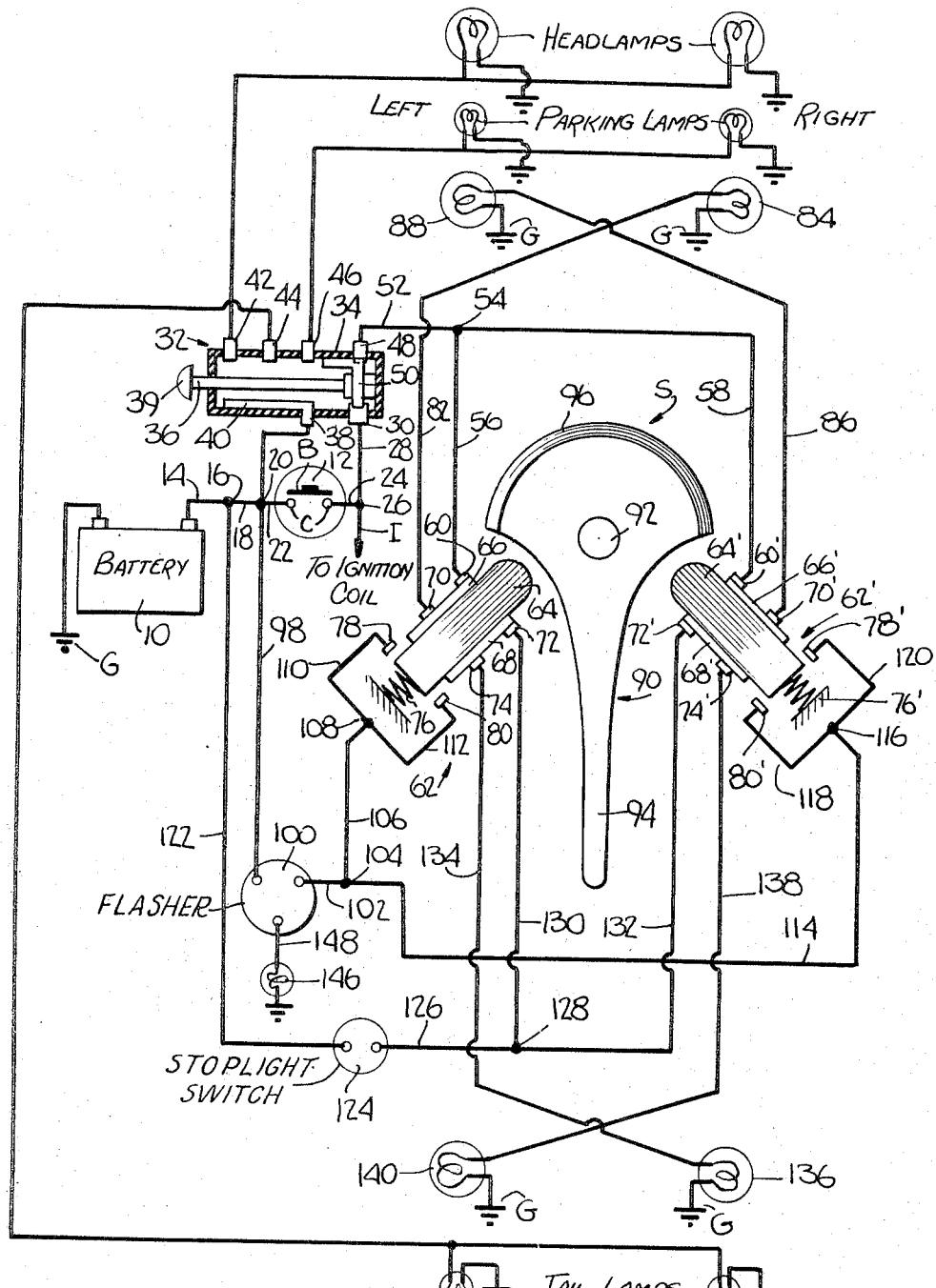

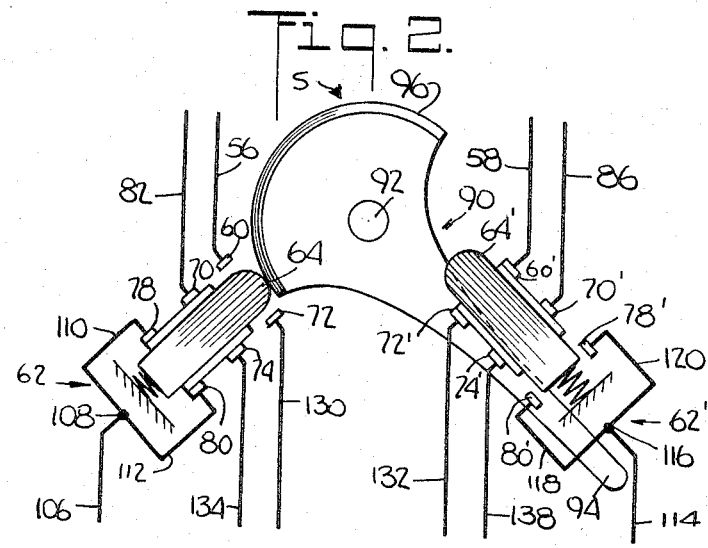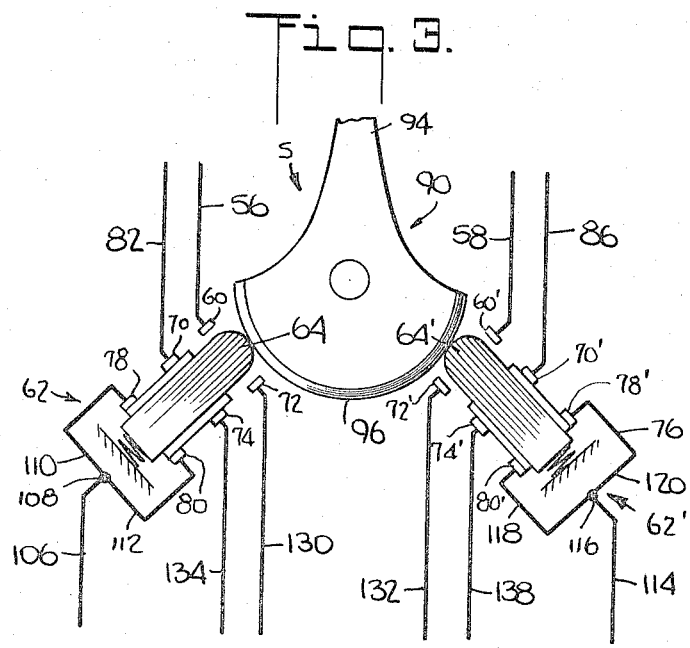

This invention relates to an automotive signaling circuit, including circuit means for illuminating front lights on an automobile whenever the vehicle is in operation during daylight hours.

With the constant increase in the number of automobiles possessed by the American public, and with the consequent increase in the number of automobiles found on the road at all hours, it has become imperative that greater safety precautions be taken to minimize the number of accidents which take place because of driver inattention and carelessness.

One promising approach to this problem is the provision of an automotive signaling circuit which will cause front lights on an automobile to burn at all times during which the vehicle is in operation, even during daylight hours. Besides insuring that drivers will have front lights on during the early morning dawn hours and during the early evening dusk hours, the energization of front lights during the bright daylight hours aids in rapidly bringing the vehicle to the attention of other vehicle operators approaching from an opposite direction. It has been shown that a vehicle, even during daylight hours, which approaches from an opposite direction with front lights burning will be noticed by another vehicle operator at a greater distance and in a shorter time than a vehicle with front lights off.

The New York Thruway Authority has been experimenting with the effectiveness of imposing a requirement that front lights be illuminated as a safety measure while a vehicle is in use during daylight hours on the New York Thruway; and it is with this safety measure in mind that I have provided a practical and useful vehicle signaling circuit to keep front lights burning while the vehicle is in operation during such hours.

The utilization of the conventional headlamp circuit presently found in all automobiles would clearly be unsatisfactory for the above purposes. With the present circuits, the headlamps could be manually turned on, but because the operator of a vehicle can himself see well during the daylight hours, he would be prone to forget to put on his headlamps during these times. Likewise even if he had turned his headlamps on during the bright daytime hours, he would be more than likely to forget to turn the headlamps off when finished driving. Further, he would not as readily notice the illumination of his headlamps upon departing from his automobile as he would were it nighttime and he had left his headlamps on. Of course, leaving such light on for an extended period after the vehicle was no longer in use could cause a serious drain on the automobile battery, and the driver might well return to a disabled vehicle and with a bias against any use of the headlamps during daylight hours in the future. Further, if the headlamp circuit, or even the front parking light circuit, as is conventional presently, were to be placed in operation, the tail lights on the vehicle would also unnecessarily burn, which would both diminish the brightness of the rear stop lamps and of the flashing directional signaling lamps by reason of a lowering in contrast in light intensity. This is especially true if the sun were shining on the rear of the vehicle, when the same was observed by another driver.

My automotive signaling circuit causes front turn signaling lamps on an automobile to be steadily energized, rather than the headlamps of the automobile, which latter lamps consume large quantities of electrical current. Such front turn signaling lamps are suitable for the above purposes since they have a high candle-power output through both the clear and amber lens covers conventionally employed. They are quickly noticeable at great distances.

Further, I desire to provide as an auxiliary feature of my invention, circuit means for emitting a distinctive emergency stop signal from an automobile, while utilizing existing front and rear turn signal lamps.

It is an object of my invention to provide an automotive signaling circuit for steadily energizing the front turn signaling lamps of an automobile whenever the automobile is in use during daylight hours.

It is a further object of my invention to provide an automotive signaling circuit of the character described which will automatically steadily illuminate the front turn signaling lamps of an automobile under the aforesaid circumstances without the necessity of additional mechanical manipulation of switches and the like by the driver of the automobile.

It is a further object of my invention to provide an automotive signaling circuit of the character described incorporating a manually operable nightlamp switch wherein when the nightlamp switch is manipulated as in the evening hours to illuminate nightlamps, i.e., the headlamps or the parking lamps, the circuit means for steadily illuminating the front turn signaling lamps during daylight hours is deenergized.

It is another object of my invention to provide an automotive signaling circuit of the character described wherein circuit means controlled by a turn signal selector switch selectively flashes either the front right and rear right or front left and rear left turn signaling lamps as desired by the driver of the automobile, both when the circuit means for steadily illuminating the front turn signaling lamps is in operation at such time as the vehicle is in use during daylight hours as well as when the automobile is in use during evening hours with its nightlamps illuminated.

It is a further object of my invention to provide an automotive signaling circuit of the character described wherein the front two signaling lamps burn steadily when the ignition switch is on, the nightlamp switch is off and the turn signal selector switch is in an "off" position.

It is a further object of my invention to provide an automotive signaling circuit of the character described including circuit means for simultaneously flashing pairs of front and rear turn signaling lamps on the automobile, when desired by the driver of the automobile, so as to create a distinctive distress signal.

These and various other objects and advantages of my invention will become apparent to the reader in the following description.

My invention accordingly consists in the features of construction, combinations of elements and arrangements of parts which will be exemplified in the device hereinafter described and of which the scope of application will be indicated in the appended claims.

In the accompanying drawings in which is shown one of the possible embodiments of my invention, FIG. 1 is a schematic circuit diagram of the automotive signaling circuit embodying my invention and showing the turn signal selector switch in "off" position; and FIGS. 2 and 3 are fragmentary portions of the circuit diagram illustrated in FIG. 1, and showing the turn signal selector switch in different operative positions.

In general I accomplish the aims of my invention by utilizing the front turn signaling lamps as daylight driving lamps which will burn steadily so long as the ignition switch is turned on and the nightlamp switch is turned off. However my signaling circuit enables these otherwise steadily burning daylight driving lamps to function as flashing turn indicating signals by movement of the turn signal selector switch into a right or left turn position. Specifically my novel signaling circuit provides two parallel energizing paths for each of the right and left front turn signaling lamps. One path furnishes a steady energization of the associated lamp and the other path furnishes a flashing energization of the associated lamp. The steady energization path connects a source of electric energy to a said lamp through a first pair of contacts controlled by the ignition switch so as to be closed when the ignition switch is in "on" position, through a second pair of contacts controlled by the nightlamp switch so as to be closed when the nightlamp switch is in "off" position and through a third pair of contacts controlled by the turn signal selector switch so as to be closed when the turn signal selector switch is in "off," i.e., idle, position (as distinguished from right turn, left turn or distress [flare] position). The flashing energization path connects the source of electric energy to a said lamp through a flasher and a fourth pair of contacts controlled by the turn signal selector switch so as to be closed when the turn signal selector switch is in an associated turn position or distress position. The flashing energization path is independent of the position of the nightlamp switch and, preferably, of the position of the ignition switch. The circuit also desirably includes other conventional components as, for example, flashing paths for the rear turn signaling lamps and brake controlled paths for the rear stop lamps.

Referring now in detail to the drawings, circuit means steadily energize both the front right and left turn signaling lamps to function as daylight driving lamps whenever the vehicle is in operation during daylight hours. That is to say, said lamps are illuminated except when the ignition switch of the automobile is in "off" (open) position or when the nightlamp switch of the automobile is in an operative position.

Said circuit means is energized by an electric power source, to wit, a conventional wet-cell battery 10 of the automobile, one terminal of which leads to ground G and the other terminal of which leads to the ignition switch 12 of the automobile. The ignition switch 12 is standard in all respects except for the additional electrical connection provided thereby in accordance with my invention. Said ignition switch may be of the locking type which is made operative from an "off" position by the insertion of a mating key therein and then by manual rotation of the switch to an "on" position. In the "off" position of said switch, a pair of switch contacts in the ignition circuit of the automobile and, usually, in the auxiliary circuits such as the radio, air conditioner, fan, etc., are open, and in the "on" position, these contacts are closed. Conventionally, one lead wire from a terminal of the ignition switch connects it to the hot terminal of the battery and another lead wire from the other terminal of the ignition switch runs to the ignition coil.

The aforesaid circuit means energizing the front turn signaling lamps includes a lead wire 14 which connects the hot terminal of the battery 10 to a junction 16 that is connected in turn by a lead wire 18 to a further junction 20, connected by a lead wire 22 to one contact C of the ignition switch 12. The other contact C of the ignition switch is connected by a lead wire 24 to a junction 26 from which a lead wire I runs to the ignition coil. The junction 26 is further connected by a lead wire 28 to a stationary supply contact 30, which contact is a component of a nightlamp switch 32 usually known as a "headlamp" switch,. A bridge B in the ignition switch bridges the contacts C only when the ignition switch is in "on" position.

The switch 32 may be advantageously described at this point before proceeding further with the description of the aforesaid circuit means.

Said switch 32 is characterized by including a pair of contacts that are closed only when the switch is in its "off" position. Said switch as shown is of the reciprocable type and includes an electrically non-conductive housing 34 in which an insulated shaft 36 is mounted for non-rotatable back-and-forth movement. The shaft 36 has a handle 39 external to the housing 34 by which the shaft may be shifted manually by the driver of the automobile.

The nightlamp switch includes the supply contact 30 and an additional stationary supply contact 38 which has an elongated internal contact bar 40. The switch 32 has four stationary output contacts, to wit, contacts 42, 44, 46 and 48. The end of the shaft 36 distant from the head 38 insulatingly carries an electrically conductive L-shaped bridge 50 which selectively connects certain of the supply contacts 50 to certain of the output contacts. In the intermediate pulled-out position of the shaft 36 the supply contact 38 is electrically connected to the output contacts 44, 46 so as to energize the parking lamps and the tail lamps. In the fully pulled-out position of the shaft 36 the supply contact 38 is electrically connected to the output contacts 42, 44 so as to energize the headlamps and the tail lamps.

Returning now to the description of the front turn signaling lamp energizing circuit, when the shaft 36 is in its inmost position (in what is the "off" position for the nightlamp switch) the bridge 50 connects the supply contact 30 to the output contact 48. The contact 48 is connected by a lead wire 52 to a junction 54 from which lead wires 56, 58 run to contacts 60, 60', respectively, which contacts are parts of the right and left hand sections 62, 62' of a turn signal selector switch S.

The sections 62, 62' are identical in construction so that only one will be described in detail, the corresponding parts of the other being identified by the same numerals primed for distinction.

The section 62 includes a longitudinally movable elongated carrier 64 of electrically non-conductive material. On one side surface, the carrier 64 is provided with a longitudinally elongated contact strip 66 and on its other side surface is similarly provided with a longitudinally elongated contact strip 68. The contact strip 66 normally (in idle position of the turn signal selector switch S) engages and electrically interconnects the contact 60 and another contact 70. Likewise, the contact strip 68 normally engages and interconnects two contacts 72 and 74.

A spring 76 biases the carrier 64 to the aforesaid idle position and towards a centrally located selector lever. On longitudinal movement of the carrier 64 away from the selector lever against the force of the biasing spring 76, the contact strip 66 disengages from the contact 60 and connects the contact 70 to another contact 78. Simultaneously, the contact strip 68 disengages from the contact 72 and connects the contact 74 to another contact 80.

When the sections 62, 62' are in their idle positions (as illustrated in FIG. 1), the contacts 60, 60' are connected by, respectively, the contact strips 66, 66' to the contacts 70, 70'. The contact 70 is connected by a lead wire 82 to one terminal of a right front turn signaling lamp 84, the other terminal of which runs to ground G. Similarly, the contact 70' is connected by a lead wire 86 to one terminal of a left front turn signaling lamp 88, the other terminal of which runs to ground G.

When the ignition switch 12 is in its closed (on) position (e.g., with a key inserted therein and the ignition switch rotated to connect the contacts C by the bridge B), and when the nightlamp control switch 32 is in its innermost "off" position, both of the front turn signaling lamps 84, 88 are energized by the battery 10 as steadily burning driving lamps through the steady energization paths just described.

If the ignition switch 12 is turned off, as by counter-rotation of the ignition switch to disconnect the contacts C, the switch is brought to its "off," i.e., open, position and the steady energization paths to the front turn signaling lamps 84, 88 are broken. Further, even with the ignition switch 12 on, when the nightlamp control switch 32 is pulled out to an operative (on) position in which the headlamps or the parking lamps and the tail lights are energized, the connection between the supply contact 30 and the output contact 48 is opened also breaking the steady energization paths to the front turn signaling lamps.

Thus, when the vehicle operator has his ignition switch in "on" position as in the course of ordinary driving during daylight hours (when the nightlamp switch 32 is normally in its "off" position) both of the front turn signaling lamps are steadily energized as daylight driving lamps through the steady energization paths. When the nightlamp switch 32 is pulled out (manipulated to an "on" position) as during the dark evening hours, or when the ignition switch 12 is in its "off" position as when the motor is not running, the front turn signaling lamps are deenergized. Of course, it will be obvious that when the headlamps of the automobile are energized, there is no need for steady energization of the front turn signaling lamps.

Circuit means provide alternative flashing energization paths to flash any selected one of the front turn signaling lamps. To this end a swingably mounted selector lever 90 is utilized to operate the sections 62, 62' of the turn signal selector switch S. Said lever is pivoted on a shaft 92 on a suitable mounting element and has an elongated operating handle 94 adapted to be manually operated by the driver of the vehicle. The lever 90 has a semi-circular camming surface 96 which has a path of travel about the shaft 92 so as to engage and depress the heads of the carriers 64, 64' whereby to shift the carriers longitudinally away from the selector lever.

Said flashing circuit means includes the selector lever 90 and the two sections 62 or 62'. For example, FIG. 2 illustrates the position of said lever for flashing the right front turn signaling lamp 84.

Rotation of the operating handle 94 to one side (here toward the right) causes the camming surface 96 to rotate, about the head of the carrier 64 in its path of travel and shift the carrier longitudinally to its distal position so as to open the circuit between the contacts 60, 70 and thus break the steady energization path to the right front turn signaling lamp 84.

However, such shifting of the carrier 64 causes a flashing energization path parallel to the steady energization path to be established which will flash the front turn signaling lamp 84. Specifically, current now flows from the junction 20 through a lead wire 98 to a standard flasher 100. The circuit continues from the flasher 100 through a lead wire 102 to a junction 104, and then through a lead wire 106 to a junction 108 which is connected by branch lead wires 110, 112, respectively, to the contacts 78, 80 of the switch section 62. From contact 78 current passes through the contact strip 66 to the contact 70, then via the lead wire 82 to one terminal of the right front turn signaling lamp 84, and thence to ground. The intermittent closing action of the flasher 100 will cause the right front turn signaling lamp 84 to flash and will thus establish a flashing right-directional signal.

When the selector lever 90 is returned to its normal "off" position (as illustrated in FIG. 1) the steady energization path of the right front turn signaling lamp 84 is reestablished, in the event that it was in operation, i.e., if the ignition switch was in "on" position and the nightlamp switch 32 was in its normal daylight "off" position.

If the selector lever 90 is rocked so that the operating handle 94 is shifted to the left, the left front, rather than the front right, turn signaling lamp 88 is flashed. Specifically, current then will flow from the junction 104, via a lead wire 114 to the junction 116 and then via branch lead wires 118, 120, respectively, to the contacts 80' and 78'. From the contact 78' current will flow through the contact strip 66' to the contact 70', and then via the lead wire 86 to one terminal of the left front turn signaling lamp 88 and to ground.

It will be appreciated that when the right front turn signaling lamp 84 is flashing, the left front turn signaling lamp 88 can be burning steadily and vice versa.

It will be further noted that the just-described flashing energization paths are not affected by the operation of the nightlamp switch 32 or the ignition switch 12, it being recalled that these flashing energization paths are in parallel with the steady energization paths that contain the contacts controlled by said switches. The only difference caused by the operation of the nightlamp switch 32 is that when this switch is in its "off" position, the front turn lamp which is not flashing will be burning steadily, while if the nightlamp switch is in one of its "on" positions (as would be the case during the evening hours), the lamp which is not flashing will not be energized. Thus, my automotive signaling circuit will selectively flash the front directional signal lamps of the automobile whether or not the headlamps or parking lamps are in operation.

Rear stop light circuit means also is provided as part of my automotive signaling circuit. Said circuit means includes a lead wire 122 which runs from the junction 16 to a conventional brake controlled stop light switch 124, then via a lead wire 126 to a junction 128, and then to the contacts 72, 72' via branch lead wires 130, 132, respectively. With the switch sections 62, 62' in their normal (idle) position illustrated in FIG. 1, current passes from the contacts 72, 72' via the contact strips 68, 68' to the contacts 74, 74'. A lead wire 134 connects the contact 74 to one terminal of the right rear stop and signaling lamp 136, the other terminal of which leads to ground G. The contact 72' is connected via a lead wire 138 to one terminal of the left rear stop and signaling lamp 140, the other terminal of which leads to ground G.

The stop light switch 124 is open when the brake pedal is unactuated and is closed only when the brakes of the automobile are applied. The closing of the stop light switch causes the mentioned rear lamps 136, 140 to be energized and to emit a steady burning light so as to indicate that the vehicle is being either slowed down or is stopped.

Referring to FIG. 2, when the right front turn signaling lamp 84 is being flashed, rear directional signaling circuit means in connection with the selector lever 90 in the illustrated position causes the right rear stop and signaling lamp 136 to be flashed. Specifically, current flows from the junction 20 via the lead wire 98 to the flasher 100, then via the lead wire 102 to the junction 104 and via the lead wire 106 to the junction 108. From the junction 108 current passes via the branch lead wire 112 to the contact 80. Due to the longitudinal shift of the carrier 64 by the selector lever 90, current passes from the contact 80 through the contact strip 68 to the contact 74 and via the lead wire 134 to one terminal of the right rear stop and signaling lamp 136. The intermittent operation of the flasher 100 will cause a flashing current to pass to the rear lamp 136 and thus to create a flashing signal indicating the intention of the vehicle operator to make a right turn.

The aforesaid operation of the selector lever 90 has only affected the right rear lamp energizing circuit and thus the left rear lamp 140 continues to burn steadily, if the stop switch 124 is closed (actuated). Without elaborate description, it need only be mentioned that rocking of the operating handle 94 to the left and longitudinal subsequent shifting of the carrier 64' will cause a flashing current to pass from the contact 80' via the contact strip 68', to the contact 74' and via the lead wire 138 to the left rear stop and signaling lamp 140.

Although only one pair of rear stop and signaling lamps 136, 140 have been illustrated for utilization at the rear of a vehicle, it is the present trend to have more pairs of lights in various combinations and it should be appreciated that the adaption of my circuit to the same is within the skill of an ordinary mechanic.

A pilot light 146 connected by a lead wire 148 to the flasher 100 will indicate when the directional flashing lamps are in operation. The pilot lamp is conventionally located on the dashboard of an automobile. This is, of course, not a feature of my invention.

Circuit means desirably is also provided to flash the turn (directional) signaling lamps on the front and rear of the vehicle simultaneously so as to indicate that the vehicle is disabled. This safety feature is of great value at night at which time it is difficult if not impossible to determine quickly if a vehicle is in motion when its front or rear lights are burning steadily. In addition, if only the left directional signal lamps of an automobile were flashing when the automobile was parked on the right shoulder of a road or highway, a driver in a following or an approaching vehicle might consider that the driver of the parked vehicle intended to make a left turn even though he might not be in the proper lane for such movement. This impression might cause the driver of the approaching or following vehicle to steer his own automobile into a wrong position on the highway and he might even run off the road or cause a serious accident due to this misapprehension.

A similar difficulty arises if the parked disabled vehicle were to have its right directional signals flashing while parked on the right shoulder of a highway or road. Having these signals flashing while parked on the right shoulder is more advisable, but these lights, being closer to the outer margin of the road, are less visible and may be obscured by objects on the side of the road.

By providing circuit means for simultaneously flashing pairs of front and rear directional lamps, a signal is created which utilizes existing lamps on the car while at the same time being dissimilar to other signals so that no confusion will ensue. The simultaneous flashing effect will cause approaching and following vehicles to slow down in order to evaluate the situation of the disabled vehicle and such vehicles will be able to pass around the disabled vehicle with safety both for the moving vehicle and for the occupants of the disabled vehicle. As has been mentioned previously, if a vehicle is equipped with more than one pair of of rear directional lamps, these lamps may also be connected into the "all lamps flashing" (distress) position, when the selector lever 90 is properly positioned.

FIG. 3 illustrates the position of the selector lever 90 for the "all lamps flashing" (distress) circuit. As seen therein, the selector lever 90 is rotated so that the camming surface 96 causes both of the carriers 64, 64' to shift to their respective positions away from the selector lever and against the force of the biasing springs 76, 76', respectively.

Simultaneous shifting of the carriers 64, 64', causes flashing current to be transmitted to both of the front turn signaling lamps 84, 88 and to both of the rear stop and turn signaling lamps 136, 140. The circuits which are brought into operation in this position of the selector lever are an aggregation of the circuits to flash the front and rear turn signaling lamps on both sides (left and right) of the vehicle, each of which has been previously fully described in connection with the description of FIG. 2. It may be noted that with the selector lever 90 in the aforesaid distress position, both the front and rear turn signaling lamps continue to flash regardless of the operating position of the ignition switch 12, i.e., even if the ignition switch is in its "off" (open) position, and regardless of the operating position of the nightlamp switch 32, i.e., even if the nightlamp switch is in an "on" position.

By this arrangement, the driver of the vehicle can place the circuits in a simultaneously flashing position and then lock the ignition and the vehicle so that the flashing continues even while he is absent from the vehicle. This distress circuit may be extremely useful in emergency circumstances. Further, with the distress circuit operative, the headlamps can burn so as to illuminate the area in the front of the vehicle whereby repairs can be made, while at the same time providing an all sides flashing signal to warn vehicles approaching from the front and rear.

It thus will be seen that I have provided a device which achieves the several objects of my invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and useful and desire to secure by Letters Patent:

1. In an automotive vehicle signaling system, right and left front turn signaling lamps, a source of electric energy, an ignition switch, a nightlamp switch, a turn signal selector switch, a flasher, a steady energization path for each of the right and left turn signaling lamps and a flashing energization path for each of the right and left turn signaling lamps, said paths connecting said lamps to said source of electric energy in parallel, each steady energization path providing a high enough potential to its respective lamp to light the same, each steady energization path connecting a said lamp to the source of electric energy through a first pair of contacts controlled by the ignition switch so as to be closed when the ignition switch is in "on" position, through a second pair of contacts controlled by the nightlamp switch so as to be closed when the nightlamp switch is in "off" position and through a third pair of contacts controlled by the turn signal selector switch so as to be closed when the turn signal selector switch is in "off" position, each flashing energization path connecting a said lamp to the source of electric energy through the flasher and another pair of contacts controlled by the turn signal selector switch so as to be closed when the turn signal selector switch is in an actuated position.

2. A combination as set forth in claim 1 wherein the turn signal selector switch includes a left turn actuated position in which the left front turn signaling lamp is flashed, a right turn actuated position in which the right front turn signaling lamp is flashed and a distress actuated position in which both front turn signaling lamps are flashed.

3. In an automotive vehicle signaling system, right and left front turn signaling lamps, a source of electric energy, a nightlamp switch, a turn signal selector switch, a flasher, a steady energization path for each of the right and left turn signaling lamps and a flashing energization path for each of the right and left turn signaling lamps, said paths connecting said lamps to said source of electric energy in parallel, each steady energization path providing a high enough potential to its respective lamp to light the same, each steady energization path connecting a said lamp to the source of electric energy through a first pair of contacts controlled by the nightlamp switch so as to be closed when the nightlamp switch is in "off" position and through a second pair of contacts controlled by the turn signal selector switch so as to be closed when the turn signal selector switch is in "off" position, each flashing energization path connecting a said lamp to the source of electric energy through the flasher and another pair of contacts controlled by the turn signal selector switch so as to be closed when the turn signal selector switch is in an actuated position.

4. In an automotive vehicle signaling system, right and left front turn signaling lamps, a source of electric energy, an ignition switch, a turn signal selector switch, a flasher, a steady energization path for each of the right and left turn signaling lamps and a flashing energization path for each of the right and left turn signaling lamps, said paths connecting said lamps to said source of electric energy in parallel, each steady energization path providing a high enough potential to its respective lamp to light the same, each steady energization path connecting a said lamp to the source of electric energy through a first pair of contacts controlled by the ignition switch so as to be closed when the ignition switch is in "on" position, through a second pair of contacts controlled by the turn signal selector switch so as to be closed when the turn signal selector switch is in "off" position, each flashing energization path connecting a said lamp to the source of electric energy through the flasher and another pair of contacts controlled by the turn signal selector switch so as to be closed when the turn signal selector switch is in an actuated position.

5. In an automotive vehicle signaling system, right and left front turn signaling lamps, a source of electric energy, a turn signal selector switch, a flasher, a steady energization path for each of the right and left turn signaling lamps and a flashing energization path for each of the right and left turn signaling lamps, said paths connecting said lamps to said source of electric energy in parallel, each steady energization path providing a high enough potential to its respective lamp to light the same, each steady energization path connecting a said lamp to the source of electric energy through a pair of contacts controlled by the turn signal selector switch so as to be closed when the turn signal selector switch is in "off" position, each flashing energization path connecting a said lamp to the source of electric energy through the flasher and another pair of contacts controlled by the turn signal selector switch so as to be closed when the turn signal selector switch is in an actuated position.

References Cited

UNITED STATES PATENTS 2,486,599   11/1949   Hollins   340—74
2,514,604   7/1950   Hollins   340—81

NEIL C. READ, *Primary Examiner.*

A. H. WARING, *Assistant Examiner.*